(12) United States Patent
Cook et al.

(10) Patent No.: US 10,974,605 B2
(45) Date of Patent: Apr. 13, 2021

(54) METHOD AND APPARATUS FOR ELECTRIC VEHICLE CHARGING

(71) Applicant: Jaguar Land Rover Limited, Coventry (GB)

(72) Inventors: Alex Cook, Coventry (GB); Oliver Legrice, Coventry (GB); Nick Carpenter, Coventry (GB); Mark McNally, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 303 days.

(21) Appl. No.: 15/748,539

(22) PCT Filed: Sep. 1, 2016

(86) PCT No.: PCT/EP2016/070592
§ 371 (c)(1),
(2) Date: Jan. 29, 2018

(87) PCT Pub. No.: WO2017/042082
PCT Pub. Date: Mar. 16, 2017

(65) Prior Publication Data
US 2018/0222337 A1    Aug. 9, 2018

(30) Foreign Application Priority Data
Sep. 7, 2015    (GB) .................................... 1515800

(51) Int. Cl.
*H02J 7/00* (2006.01)
*H02J 7/14* (2006.01)
(Continued)

(52) U.S. Cl.
CPC ........... *B60L 11/1818* (2013.01); *B60L 53/16* (2019.02); *B60L 53/305* (2019.02); *B60L 53/65* (2019.02);
(Continued)

(58) Field of Classification Search
USPC .......................................................... 320/109
See application file for complete search history.

(56) References Cited

U.S. PATENT DOCUMENTS

| 5,934,918 A | 8/1999 | Wuechner |
| 2009/0242288 A1* | 10/2009 | Oyobe ................. B60L 15/007 180/65.265 |

(Continued)

FOREIGN PATENT DOCUMENTS

| DE | 10 2012 021 518 A1 | 5/2014 |
| FR | 2 754 644 A1 | 4/1998 |

(Continued)

OTHER PUBLICATIONS

Patents Act 1977: Combined Search and Examination Report under Sections 17 and 18(3), UKIPO Application No. GB1515800.9, dated Mar. 9, 2016, 8 pp.

(Continued)

*Primary Examiner* — Alexis B Pacheco
(74) *Attorney, Agent, or Firm* — Reising Ethington P.C.

(57) ABSTRACT

Embodiments of the present invention provide a method of charging an electric vehicle. The method comprises receiving at an electric vehicle, a wireless signal associated with an electric vehicle charging apparatus. Upon receiving the signal the method comprises controlling an actuator to open, in dependence on receiving the wireless signal, an enclosure housing a socket for receiving the charging plug. Embodiments of the invention also provide an enclosure for a charging socket of an electric vehicle.

20 Claims, 9 Drawing Sheets

(51) Int. Cl.
*B60L 11/18* (2006.01)
*B60L 53/16* (2019.01)
*B60L 55/00* (2019.01)
*B60L 53/65* (2019.01)
*B60L 53/30* (2019.01)

(52) U.S. Cl.
CPC ............ *B60L 55/00* (2019.02); *B60L 2270/32* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(56) References Cited

U.S. PATENT DOCUMENTS

| | | | | |
|---|---|---|---|---|
| 2011/0300728 A1* | 12/2011 | Katagiri | ............... | B60L 53/18 439/147 |
| 2012/0007554 A1* | 1/2012 | Kanamori | ............. | H01M 10/44 320/109 |
| 2012/0083148 A1* | 4/2012 | Hirashita | ........... | H01R 13/6275 439/304 |
| 2012/0256589 A1* | 10/2012 | Ichikawa | ............ | B60L 11/1824 320/111 |
| 2013/0193923 A1* | 8/2013 | Kimura | ............... | B60L 11/1818 320/109 |
| 2015/0177302 A1* | 6/2015 | Lu | ............... | B60L 3/12 324/72 |
| 2016/0028187 A1* | 1/2016 | Kojima | ............. | H01R 13/6397 439/345 |
| 2016/0028262 A1* | 1/2016 | Lee | ............... | H01R 13/447 320/155 |
| 2016/0083981 A1* | 3/2016 | Kondo | ............... | B60K 1/04 49/31 |
| 2016/0325635 A1* | 11/2016 | Masuda | ............ | B60L 11/1816 |
| 2017/0349057 A1* | 12/2017 | Namba | .............. | B60L 53/66 |

FOREIGN PATENT DOCUMENTS

| | | |
|---|---|---|
| JP | 11-318004 A | 11/1999 |
| KR | 10-2011-0035492 A | 4/2011 |

OTHER PUBLICATIONS

Patents Act 1977: Combined Search and Examination Report under Sections 17 and 18(3), UKIPO Application No. GB1614798.5, dated Feb. 3, 2017, 8 pp.

International Search Report and Written Opinion of the International Searching Authority, International Application No. PCT/EP2016/070592, dated Jan. 20, 2017, 17 pp.

Communication pursuant to Article 94(3) EPC, EP Application No. 16758207.1, dated Jan. 23, 2020, 4 pp.

* cited by examiner

METHOD AND APPARATUS FOR ELECTRIC VEHICLE CHARGING

RELATED APPLICATIONS

This application is a 35 U.S.C. § 371 national stage application of PCT Application No. PCT/EP2016/070592, filed on Sep. 1, 2016, which claims priority from Great Britain Patent Application No. 1515800.9, filed on Sep. 7, 2015, the contents of which are incorporated herein by reference in their entireties. The above-referenced PCT International Application was published in the English language as International Publication No. WO 2017/042082 A1 on Mar. 16, 2017.

TECHNICAL FIELD

The present disclosure relates to charging of electric vehicles. Aspects of the invention relate to a method of charging an electric vehicle, to a control system for charging an electric vehicle, and to an electric vehicle.

BACKGROUND

Electric vehicles may comprise a battery which is charged from an external power source. The power source may be charging station at a user's home or office, for example, or one available to the public for example at a parking location or a service station. Such external power sources may provide an AC or DC electrical supply for charging the battery of the electric vehicle. The electrical supply of the charging station is coupled to an electrical system of the vehicle via a plug of the charging station which is releaseably received in a charging socket of the vehicle. A person, usually an occupant of the vehicle, obtains the plug from the charging station. The charging socket of the vehicle is often located within an enclosure about an exterior of the vehicle. A plurality of electrical sockets may be provided in the enclosure for connecting to different electrical supplies, such as different voltages, current ratings and electrical types e.g. AC or DC. The enclosure may comprise a door openable by the user to allow access to the one or more charging sockets of the vehicle. The door may form an exterior surface of the vehicle i.e. an exterior of the enclosure door may, when closed, be co-planar with adjacent body-panels of the vehicle. The door provides an aesthetic enclosure for the socket. The person may then open a cover of the socket before inserting the plug into the socket to begin charging the electric vehicle. The cover may be hingeably connected to a side of the socket and biased to substantially seal the socket in a closed position. The cover of the socket is provided to prevent water and dirt ingress into the socket and to protect electrical connections of the socket.

It is an object of embodiments of the invention to facilitate a charging process of an electric vehicle. It is an object of embodiments of the invention to at least mitigate one or more of the problems of the prior art.

SUMMARY OF THE INVENTION

Aspects and embodiments of the invention provide a method of charging an electric vehicle, a control system for charging an electric vehicle, and an electric vehicle as claimed in the appended claims.

According to an aspect of the invention, there is provided a method of charging an electric vehicle, comprising; receiving, at an electric vehicle, a wireless signal associated with an electric vehicle charging apparatus; and controlling an actuator to open, in dependence on receiving the wireless signal, an enclosure housing a socket for receiving the charging plug. Advantageously, this allows a user to bring the charging plug close to the charging socket and the enclosure open automatically.

Optionally, the wireless signal may be transmitted by transmitter means associated with a plug of the electric vehicle charging apparatus, and the wireless signal may be a short-range wireless signal, which may have a range of up to 5 m. The wireless signal may be an RFID signal generated by a device associated with the charging apparatus. Advantageously, this allows only signals from an appropriate charging apparatus to cause the enclosure to open.

Optionally, the actuator may cause the enclosure to close, in dependence on ceasing to receive the wireless signal. Advantageously, this allows the enclosure to close automatically when the signal is removed, preventing access to the charging socket when not in the vicinity of an appropriate electric vehicle charging apparatus.

Charging of battery means of the electric vehicle may be initiated in dependence on receiving a plug of the electric vehicle charging apparatus. Advantageously, this allows the electric vehicle to be charged when connected to the electric vehicle charging apparatus.

Optionally, an authentication signal may be received from an authentication device, indicating the locking of the electric vehicle. In response to the received signal when the battery means is being charged, the actuator may be caused to partially close the enclosure, to secure the plug. The charging plug may alternatively or additionally be secured by a securing actuator, such as a solenoid, operative to secure the charging plug in the socket. Advantageously, this prevents unauthorised people removing the charging plug.

The identity of the electric vehicle charging apparatus and suitability of the apparatus to charge the electric vehicle based on the identity may be determined, and the controlling the actuator to open the enclosure may be performed in dependence on the suitability of the electric vehicle charging apparatus. Similarly, whether battery means of the electric vehicle is fully charged may be determined and the controlling the actuator to open the enclosure may be performed in dependence on whether the battery means is fully charged. Additionally, a status of a charging system of the electric vehicle may be determined, wherein the controlling the actuator to open the enclosure may be performed in dependence on whether the status indicates the charging system has an electrical fault or short. Advantageously, this prevents the enclosure from opening when there is an incompatible electric vehicle charging apparatus. Also the enclosure is prevented from opening when the battery means is fully charged, or where there is an electrical fault with the charging system, preventing damage to the system and also preventing possible injury to the user.

Optionally, discharging of the battery may initiate in dependence on the battery being coupled to the electric vehicle charging apparatus. The discharged electrical power of the battery may be provided to an electric grid system. The electric vehicle charging apparatus may be coupled to the electric grid charging system. The battery may be coupled to the electric vehicle charging apparatus via a charging plug of the electric vehicle charging apparatus. The enclosure may partially close when the battery is discharging to the electric grid system, thereby securing the charging plug. The enclosure may open when the discharging is completed, thereby enabling the removal of the charging plug.

The enclosure may comprise a first part forming an external surface of the vehicle; and a second part having a longitudinal axis forming a rear of the enclosure. The actuator may move the first part between an open and closed position relative to the second part, and in moving from the open position to the closed position, the first part follows a path relative to the longitudinal axis. The path includes a circumferential component about the longitudinal axis and a radial component towards the longitudinal axis. Advantageously, moving radially towards the longitudinal axis, the first part forms a substantially sealed enclosure with the second part, preventing ingress of liquid and dust into the enclosure which may damage the charging socket.

Optionally, the actuator may move the first part between the open and closed position by a mechanism, wherein the mechanism may comprise an axle; a plurality of cams with an arc-shaped track fixedly secured to the axle; and a plurality of guiding tracks. The guiding tracks may be arranged to guide the first part between the open and closed position along the path. The actuator may be arranged to cause the axle to rotate. The mechanism may comprise a plurality of brackets fixedly secured to the first part. The brackets may comprise a pin arranged to move within the arc-shaped track of one of the plurality of cams and within one of the guiding tracks. Advantageously, this allows the first part of the enclosure to move along the path so that when in the closed position there is a substantially sealed enclosure preventing the ingress of liquid and dust.

A seal may be associated with either or both of the first part and second part such that when moving along the radial component of the path towards the longitudinal axis the seal is compressed such that the substantially sealed enclosure is formed between the first part and second part. Advantageously, this prevents the ingress of liquid and dust into the enclosure, and also removes the need for a respective cover over the charging socket, such as a spring-loaded or close-fitting flexible cover i.e. a rubber-bung type cover.

According to another aspect of the invention, there is provided a control system for charging an electric vehicle, which may comprise a receiver means for receiving a wireless signal associated with an electric vehicle charging apparatus and outputting a signal in dependence thereon, and an actuator means for moving a portion of an enclosure between an open position and a closed position, wherein in the open position the enclosure permits access to a charging socket of the electric vehicle housed therein and in the closed position the enclosure is substantially closed around the charging socket. The control system may also comprise control means arranged to receive the signal output by the receiver means and to control the actuator means to selectively configure the enclosure in the open and closed positions in dependence thereon. Advantageously, this allows a user to bring the charging plug close to the charging socket and the enclosure open automatically.

According to another aspect of the invention, there is provided an electric vehicle, which may comprise a charging socket housed within an enclosure, the enclosure may be selectively openable and closeable by an actuator; receiver means for receiving a wireless signal associated with an electric vehicle charging apparatus; and control means arranged to control the actuator to open the enclosure in dependence on the receiver means receiving the wireless signal. Advantageously, this allows a user to bring the charging plug close to the charging socket and the enclosure open automatically.

Optionally, the enclosure may comprise a cover portion arranged to be moveable by the actuator between an open position allowing access to the charging socket and a closed position in which the charging socket is substantially enclosed. Advantageously, this allows a user to bring the charging plug close to the charging socket and the enclosure open automatically.

The enclosure may be arranged at a front of the vehicle, such that the cover portion is arranged between first and second headlights of the vehicle. Optionally, the cover portion may be rotatably mounted about a hinge and the actuator is arranged to move the cover portion between the open and closed positions. The cover portion may be supported on one or more arms to be rotateably mounted about the hinge. Advantageously, this allows a user to have easy access to the charging socket when parked near an electric vehicle charging apparatus.

The vehicle may comprise a transmitter means for transmitting a wireless signal to the electric vehicle charging apparatus. The transmitter means may comprises a coil for coupling with a device associated with the vehicle charging apparatus and the receiver means is arranged to determine modulation of an electromagnetic field transmitted by the transmitter means by the device. Advantageously, this allows only signals from an appropriate charging apparatus to cause the enclosure to open.

According to another aspect of the invention, there is provided an enclosure for housing a charging socket in a vehicle, comprising a first part forming an external surface of the vehicle; a second part, having a longitudinal axis, forming a rear of the enclosure; and an actuator means for moving the first part between an open and closed position relative to the second part. In moving from the open position to the closed position, the first part follows a path relative to the longitudinal axis that includes a circumferential component about the longitudinal axis and a radial component towards the longitudinal axis, and by moving radially towards the longitudinal axis, the first part forms a substantially sealed enclosure with the second part. Advantageously, the creation of a substantially sealed volume between the door and the rear housing prevents an ingress of liquid and dust damaging the components of the charging socket.

Optionally, the actuator means may be arranged to move a mechanism comprising an axle, a plurality of cams each having a primary guiding track fixedly secured to the axle, a plurality of main guiding tracks, and a plurality of brackets arranged to support the first part, wherein the brackets each comprise one or more pins arranged to move within the main guiding track and the primary guiding track. The actuator means may be arranged to rotate the axle about its longitudinal axis such that the pin or pins associated with each bracket are forced along the guiding track. Advantageously, the mechanism enables the first portion to move between an open and closed position in the manner described above, and also such that when in the closed position a substantially sealed volume is maintained.

Optionally, when the first part is opening, the axle rotates about its longitudinal axis causing the cams, which are fixedly secured to the axle, to rotate. The rotational movement of the cams is transferred to the first part by the plurality of pins each associated with of the plurality brackets attached to the first part, wherein the rotation of the cams causes the pins to move forwards and backwards in one of the plurality of guiding tracks depending upon the direction of rotation of the axle. Advantageously, this enables the first part to open and close to provide a user with access to the charging socket.

When opening, the actuator means causes the axle to rotate about its longitudinal axis, and the shape of the guiding track forces the first part to move forwards along the radial component of the path away from the longitudinal axis, and then rotate upwards about the circumferential component of the path providing access to the charging socket. The rotational movement of the axle is converted to the movements described above by the plurality of cams and the pins associated with the plurality of brackets which causes the first part to move in the manner described. Advantageously, the forward motion enables a seal between the first and second parts to be broken, and removes the requirement for a separate cover over the charging socket to prevent liquid and dirt ingress into the charging socket i.e. such as a spring-loaded or rubber cover over the charging socket.

When closing, the actuator means causes the axle to rotate about its longitudinal axis, and the shape of the guiding track causes the first part to rotate downwards about the circumferential component of the path and then move backwards along the radial component of the path towards the longitudinal axis. The backward motion causes the first part to form a substantially sealed volume with the second part. The rotational movement of the axle is converted to the movements described above by the plurality of cams and the pins associated with the plurality of brackets causing the first part to move in the manner described. Advantageously, the creation of a substantially sealed volume removes the need for a cover over the charging socket and prevents liquid and dirt from entering the enclosure and damaging the components of the charging socket.

Optionally, there is a seal surrounding one or both of the first and second parts such when moving to the closed position movement along the radial component of the path compresses the seal to form the substantially sealed volume. Advantageously, the creation of a substantially sealed volume removes the need for a spring loaded cover over the charging socket and prevents liquid and dirt from entering the enclosure and damaging the components of the charging socket.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
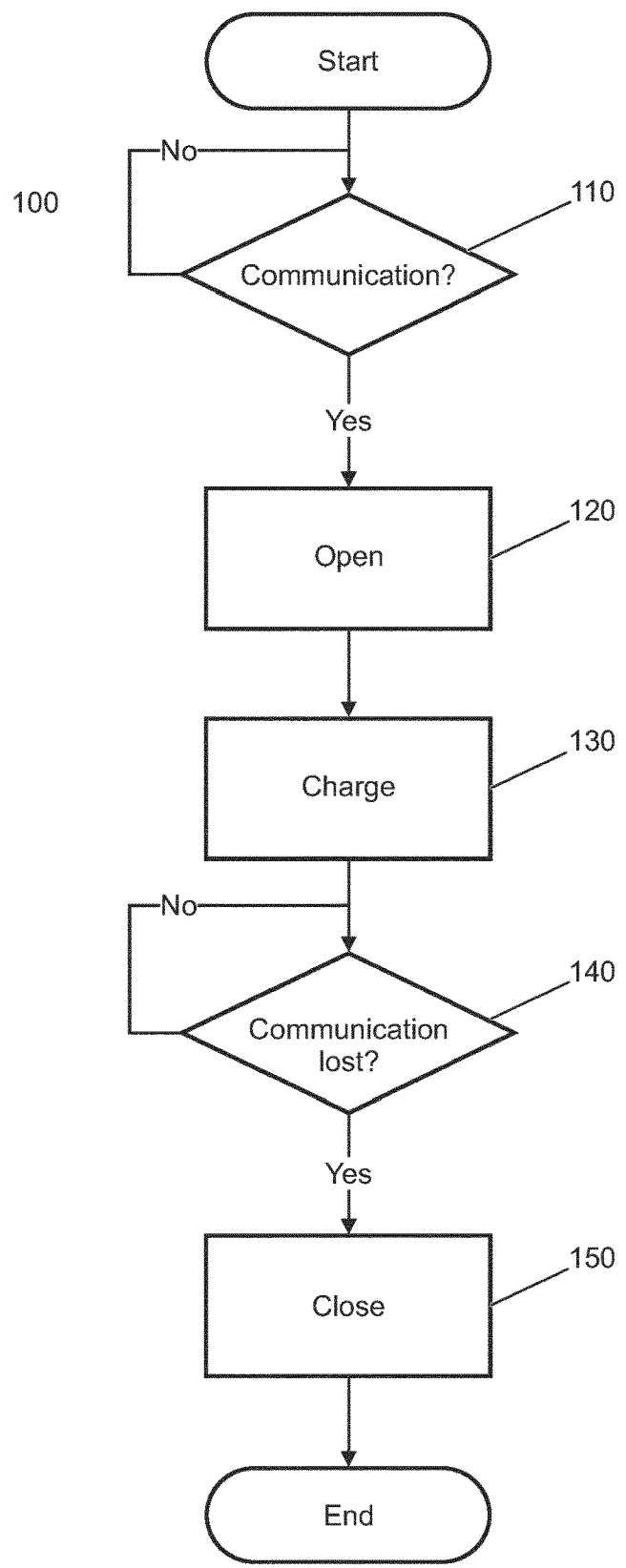
FIG. 1 illustrates a method according to an embodiment of the invention.

Hybrid vehicles generally comprise an internal combustion engine, an electric machine, a battery and a control system for determining whether the vehicle is driven by the engine, the electric machine operative as an electric motor or a combination of the engine and the motor. The battery may be charged by a vehicle generator, such as the electric machine acting as a generator, for example during regenerative vehicle braking. In some circumstances the engine may drive the electric machine (as the generator) to charge the battery. Such hybrid electric vehicles may be known as a mild hybrid electric vehicle (MHEV), a full hybrid electric vehicle (HEV) or a plug-in hybrid electric vehicle (PHEV), although it will be realised that these are not limiting. Electric vehicles are also known which lack an internal combustion engine where the vehicle is only driven by an electric motor, such as an electric machine operative as a motor, only and may be known as, a battery electric vehicle (BEV) or just an electric vehicle (EV). It will be understood that as used herein the term "electric vehicle" as used herein encompasses all of the above vehicles, including those with an internal combustion engine, unless specifically indicated otherwise.

Embodiments of the invention relate to charging of electric vehicles where the vehicle comprises a battery which may be charged from an external power source. The power source may be a charging station at a user's home or office, for example, or one available to the public for example at a parking location or a service station. Such external power sources may provide an AC or DC electrical supply for charging the battery of the electric vehicle. The electrical supply of the charging station is coupled to an electrical system of the vehicle via a plug of the charging station which is releaseably received in a socket of the vehicle. A person, usually an occupant of the vehicle, obtains the plug from the charging station. The charging socket of the vehicle is often located within an enclosure about an exterior of the vehicle. A plurality of electrical sockets may be provided in the enclosure for connecting to different electrical supplies, such as different voltages, current ratings and electrical types e.g. AC or DC. The enclosure may comprise a door openable by the user to allow access to the one or more charging sockets of the vehicle. The door may form an exterior surface of the vehicle i.e. an exterior of the enclosure door may, when closed, be co-planar with adjacent body-panels of the vehicle. The door provides an aesthetic enclosure for the socket. The person may then open a cover of the socket before inserting the plug into the socket to begin charging the electric vehicle. The cover may be hingeably connected to a side of the socket and biased to substantially seal the socket in a closed position. The cover of the socket is provided to prevent water and dirt ingress into the socket and to protect electrical connections of the socket.

In some embodiments the external power source, such as a charging station, is not always used for charging the vehicle. In certain circumstances the battery of the vehicle may discharge when coupled to the external power source to provide the electrical power stored in the battery of the vehicle to an electricity grid system through the external power source. Therefore the battery of the vehicle may at certain times be charged by the electricity grid system through the external power source, and at other times the battery of the vehicle may discharge to provide electrical power to the electricity grid system through the external power source. For example a person, such as an owner of the vehicle, may couple the battery of the vehicle to a first external power source at a time of day when electrical demand on the electricity grid system is low. This time of day may in some, but not all circumstances, be at night. In some, but not all circumstances, the first external power source may be a charging station at the owner's home. The owner may then at a different point in time couple the battery of the vehicle to a second external power source at a time of day when electrical demand on the electricity grid system is high. The second external power source may, for example, be at the owner's office. The battery may then discharge to provide electrical power to the electricity grid system. It may be determined before the battery discharges whether the battery will have sufficient remaining charge after discharging to provide the vehicle with enough power for a journey. For example it may be determined that the battery cannot be discharged because the battery would not have enough remaining charge for a journey to the user's home. Alternatively it may be determined that the battery is allowed to discharge by a certain amount, so that the remaining charge is enough for a journey to the user's home.

FIG. 1 illustrates a method 100 of charging an electric vehicle according to an embodiment of the invention. The method 100 will be explained with reference to FIG. 2 which schematically illustrates an electric vehicle 200 and a charging station 280 according to embodiments of the invention.

Figure 2:
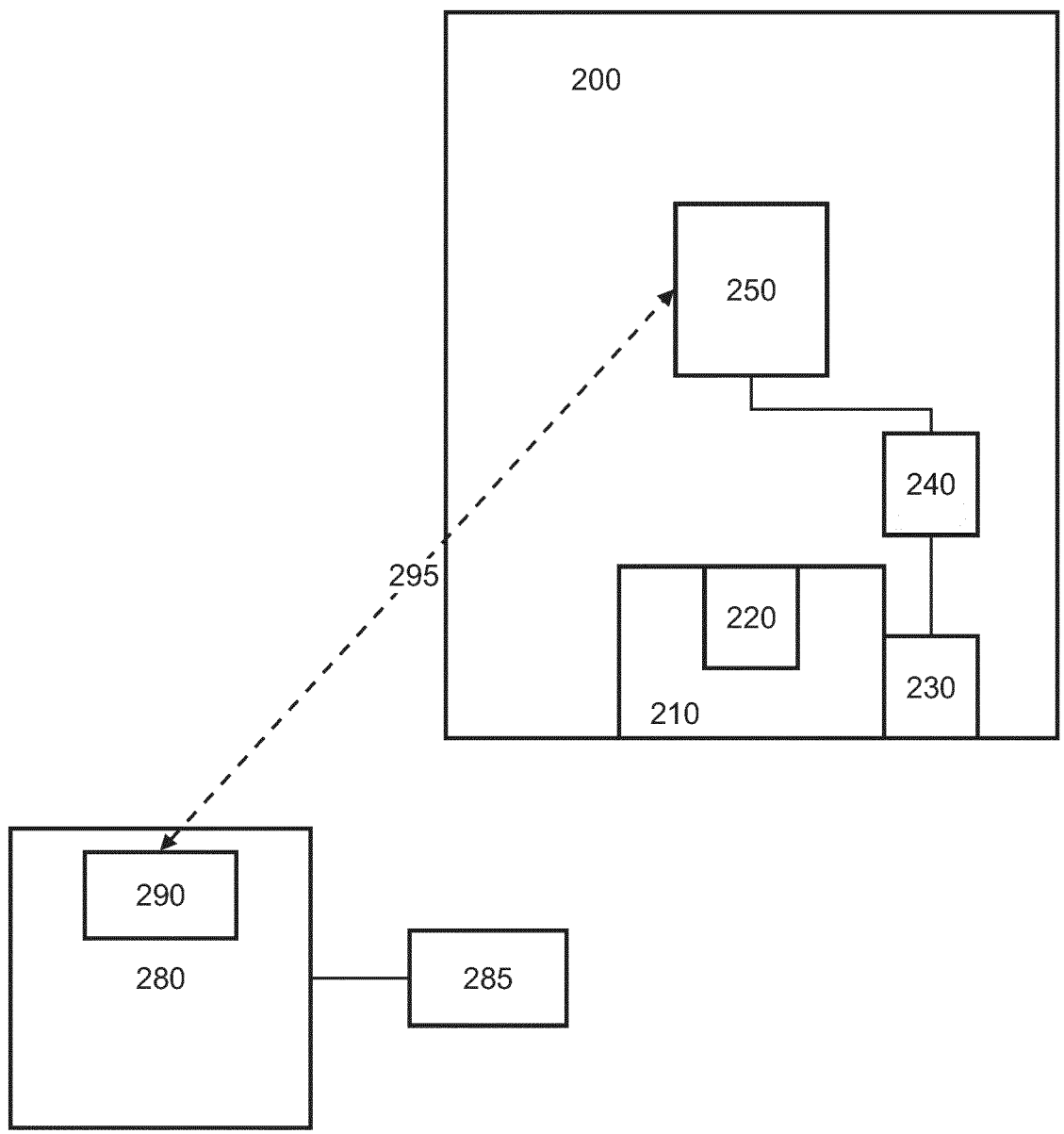
FIG. 2 schematically illustrates a vehicle and charging station according to an embodiment of the invention.

Referring to FIG. 2, the vehicle 200 comprises an enclosure 210 housing one or more electrical sockets 220 for coupling to an electrical supply to charge a battery (not shown) of the vehicle 200. The enclosure 210 houses the one or more sockets (for convenience reference will be made from herein to one socket 220; it being understood that this is not limiting) to provide a generally weatherproof compartment for the socket 220. The enclosure 210 comprises at least one moveable portion which is moveable, by an actuator means 230, between an open position allowing access to the socket 220 and a closed position in which the socket 220 is substantially enclosed.

The actuator means 230 is, in one embodiment, an actuator device 230 for moving the moveable portion of the enclosure 210 responsive to a control signal from a control means 240. The control means 240 is communicably coupled with a communication means 250 of the vehicle 200. In some embodiments the communication means 250 may be formed by one or more communication devices, as will be explained. The communication means 250 is for wirelessly communicating with a communication means 290 associated with a charging station 280 for providing the electrical supply to charge the battery of the vehicle 200. The communication means 250, 290 may be one of one of a receiver, transmitter and/or transceiver, as appropriate. The charging station provides an AC or DC electrical supply for charging the battery of the electric vehicle 200. The electrical supply of the charging station 280 is coupled to an electrical system of the vehicle via a plug 285 of the charging station 280 which is coupleable with the socket 220 of the vehicle 200.

The charging station 280 is located at a geographical location, such as adjacent to a parking space, which may be at a residential property, proximal to a street or at a service station, for example. Prior to initiating charging of the battery of the vehicle 200, communication 295 is made between the communication means 250 of the vehicle 200 and the communication means 290 associated with the charging station 280. The communication 295 may be made whilst the vehicle 200 is still in motion, such as when the vehicle 200 approaches the charging station 280. During such an approach the vehicle 200 may be travelling at less than a predetermined speed. In one example the predetermined speed is less than 20 kmh$^{-1}$ although it will be realised that other speeds may be envisaged. A communication 295 range of the respective communication means 250, 290 may be relatively short-range such as up to 50 m, or up to 20 m, although it will be realised that other distances may be used. Thus communication 295 between the communication means 250 of the vehicle 200 and the communication means 290 associated with the charging station 280 may only be made when the vehicle is relatively close to the charging station 280, such as when the vehicle 200 is approaching the charging station 280 or parks adjacent to the charging station 280. The communication 295 may be made according to a predetermined communication protocol, such as Bluetooth although it will be realised that other communication technologies may be used, as will be discussed below.

In another embodiment, the communication means 290 of the charging station 280 has a still shorter range of communication, which may be the order of a few meters. For example, the range of communication 295 may be up to 2 m, up to 1 m or up to 0.5 m, although it will be realised that other ranges of communication may be envisaged. The range of communication 295 is such that, even when the vehicle is parked generally proximal to the charging station 280, communication is not established between the communication means 250 of the vehicle 200 and the communication means 290 associated with the charging station 280. In this embodiment the communication means 290 associated with the charging station 280 is associated with the plug 285 or a cable between the plug 285 and charging station 280. Furthermore, the communication means 250 of the vehicle 200 may be located about the vehicle 200 proximal to the enclosure 210. Thus the plug 285 is required to be moved by a person closer to the enclosure 210 in order for the communication 295 to be established between the respective communication means 250, 290.

Referring to FIG. 1, in step 110 it is determined whether communication 295 is made between the communication means 250 of the vehicle 200 and the communication means 290 associated with the charging station 280. If communication is not made the method returns, i.e. loops within, step 110. As discussed above, in some embodiments the communication 295 is made by the vehicle 200 being relatively close to the charging station 280, whilst in other embodiments communication is only made once the plug 285 associated with the communication means 290 of the charging station 280 is moved by a person closer to the enclosure 210 housing the socket 220. It will be understood that communication being made may comprise a wireless signal being received at the communication means 250 of the vehicle 200 from the communication means 290 of the charging station 280. The communication means 250 of the vehicle 200 may be arranged to output a signal to the control means 240 indicative of the establishment of communication. Once communication is made, the method 200 moves to step 120.

In step 120, in dependence on receiving the wireless signal 295 in step 110, the actuator means 230 is controlled to open the enclosure 210 housing the socket 220. As noted above, the enclosure 210 comprises a moveable portion which is moveable by the actuator means 230 from the closed position to the open position to allow access to the socket 220. Prior to the method 200 the moveable portion is understood to have been in the closed position. As discussed above, in some embodiments communication 295 is only made once the plug 285 associated with the communication means 290 of the charging station 280 is moved by a person closer to the enclosure 210 housing the socket 220. Thus, in some embodiments, responsive to the movement of the plug 285 toward the enclosure 210 the actuator means 230 is caused to open the moveable portion of the enclosure 210. Movement of the actuator means 230 may be caused by the control means 240 responsive to the communication 295 from the communication means 250 received in step 110.

In step 130 charging of the vehicle 200 is performed once the enclosure 210 allows access to the socket 220 housed therein. In step 130, the person couples the plug 285 from the charging station 280 with the corresponding socket 220 of the vehicle 200 in order to establish an electrical connection between the electrical supply and the battery of the vehicle 200. It will be realised that the connection may be via a charging system of the vehicle which is not illustrated in FIG. 2. In some embodiments, an authentication means, such as an authentication signal received from a key fob or other mobile device, may be received by the vehicle to lock or unlock the vehicle. It will be appreciated other authentication means may be used. The authentication means may indicate the user has left the vicinity of the vehicle and it may be desirable to secure the plug 285 of the charging station 280 in the charging socket 220. In some embodiments, the detection of the authentication signal may result in the enclosure being partially closed thereby securing the plug 285 in the charging socket 220. Once charging of the battery is complete, or time available to the person for charging the battery has elapsed, the enclosure may open fully and the person uncouples the plug 285 from the socket 220 thus disconnecting the electrical supply to the vehicle 200. Alternatively, an authentication signal may be required to allow the enclosure to open fully again after it has been partially closed. The plug 285 may be returned to the charging station 280. The process of returning the plug 285 may comprise allowing or causing the cable associated with the plug 285 to be retracted into the charging station 280 and the plug 285 being located in a storage position about the charging station 280.

In some embodiments, the return of the plug 285 to the charging station 280 may cause communication 295 between the communication means 250 of the vehicle 200 and the communication means 290 associated with the charging station 280 to be ceased or lost. That is, particularly in embodiments where the communication means 290 is associated with the plug 285, movement of the plug 285 away from the vehicle 200 causes the ceasing of communication 295. However in other embodiments the ceasing may be due to the vehicle 200 moving away from the charging station 280. The ceasing may be due to the communication means 290 associated with the charging station 280 moving out of range of the communication means 250 associated with the vehicle 200. If communication 295 is not ceased i.e. continues, the method returns, i.e. loops within, step 140. Once communication 295 is lost, the method 200 moves to step 150.

In step 150, in dependence on the loss of the communication 295 in step 140, the actuator means 230 is controlled to close the enclosure 210 housing the socket 220. The moveable portion of the enclosure 210 is moved by the actuator means 230 from the open position to the closed position to prevent access to the charging socket 220. Once closed, the enclosure 210 may provide a substantially weather-proof housing for the socket 220.

In some embodiments, it may be determined whether the battery means is substantially fully charged. If the battery means is substantially fully charged then the actuator means 230 may not open the enclosure to enable the user to connect the vehicle to the charging station 280. Similarly, in other embodiments, in the event of an electrical fault, such as a short circuit, the enclosure may not open. This prevents the user from connecting the vehicle to the charging station 280 and damaging either the charging station 280 or the vehicle, and may also prevent a possible injury.

Figure 3:
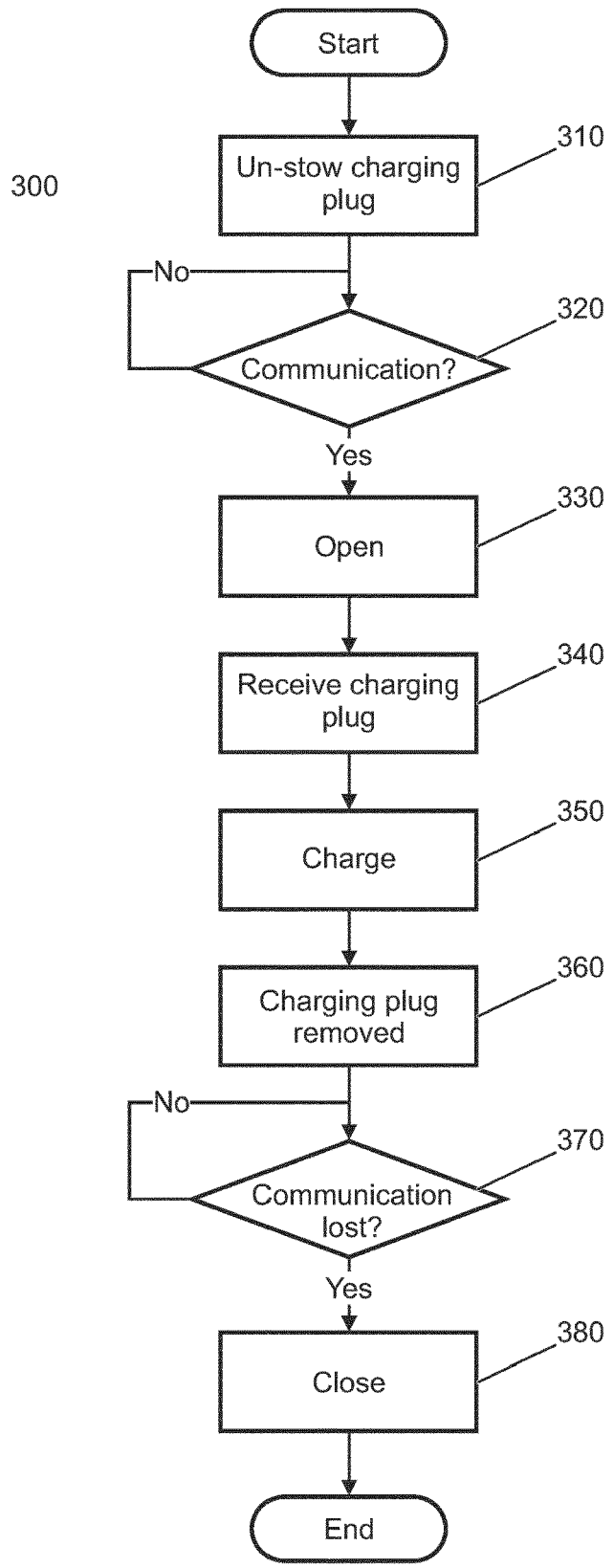
FIG. 3 illustrates a method according to a further embodiment of the invention.

FIG. 3 illustrates a further method 300 of charging an electric vehicle according to an embodiment of the invention. The method 300 will be explained with reference to FIG. 4 which schematically illustrates an electric vehicle 400 and a charging station 480 according to further embodiments of the invention. Unless otherwise described, like parts to those described in connection with FIGS. 1 and 2 have the same function.

The vehicle 400 comprises an enclosure 410 housing one or more electrical sockets 420, hereinafter socket 420, for coupling to an electrical supply to charge a battery (not shown) of the vehicle 400. The enclosure 410 comprises at least one moveable portion which is moveable, by an actuator means 430, between an open position allowing access to the charging socket 420 and a closed position in which the charging socket 420 is substantially enclosed. The actuator means 430 is, in one embodiment, an actuator device 430 for moving the moveable portion of the enclosure 410 responsive to a control signal from a control means 440. The control means 440 is communicably coupled with a communication means 450 of the vehicle 400. The communication means 440 may be one of a receiver and a transceiver, as appropriate.

Figure 4:
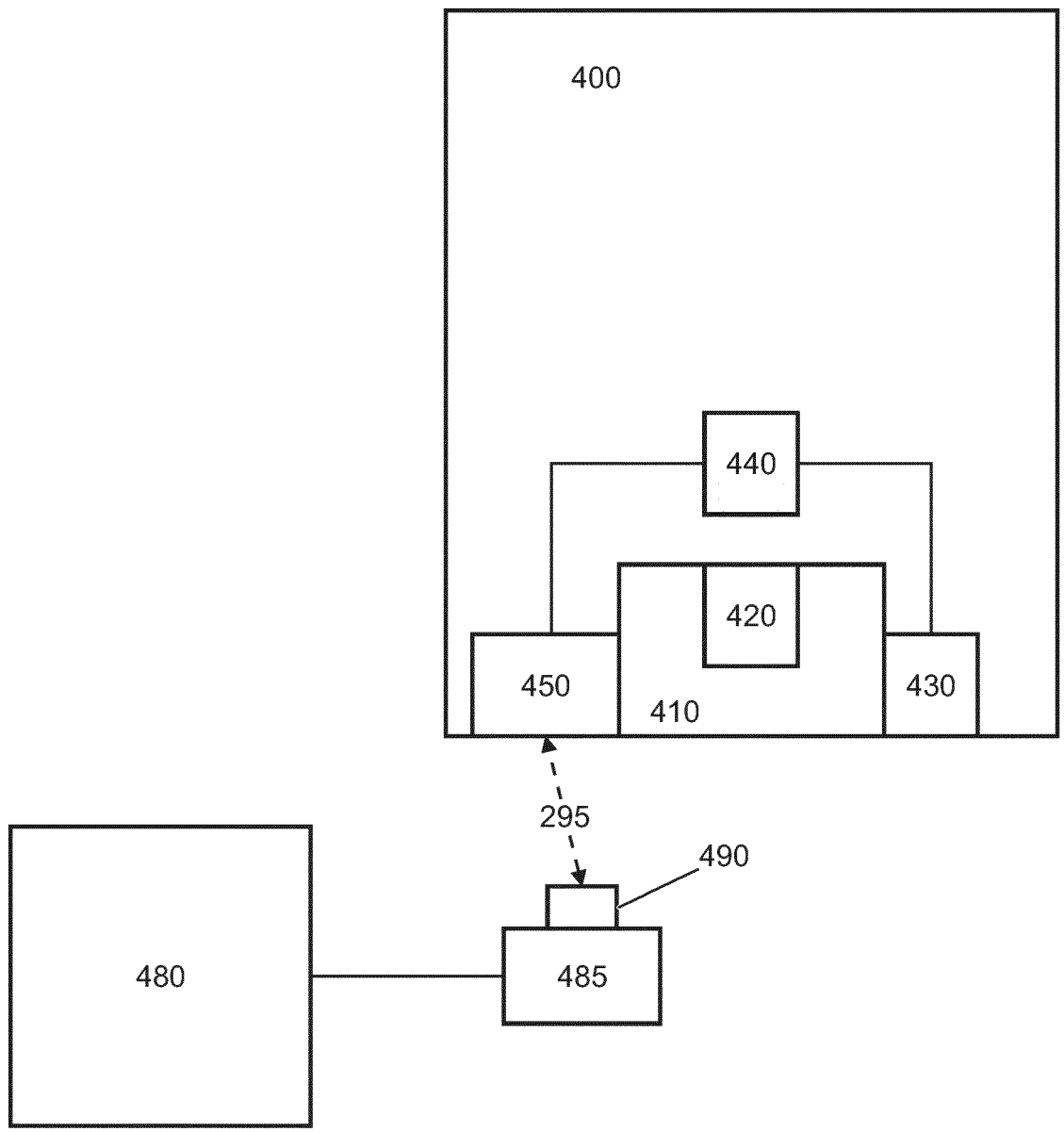
FIG. 4 schematically illustrates a vehicle and charging station according to a further embodiment of the invention.

In the embodiment of FIG. 4 the enclosure 410 is provided at a front of the vehicle 400. The enclosure 410 is arranged to be forward-facing from the front of the vehicle 400. In particular, the enclosure 410 may be arranged in a region between first and second headlights of the vehicle 400 generally at a central axis of the vehicle 400. The enclosure 410 may be located below a bonnet or hood of the vehicle 400 when the bonnet is in a respective closed position. The enclosure 410 may be located at a grille location of the vehicle. In some embodiments the enclosure 410 comprises a door arranged to be moveable, by the actuator means 430, between the open position allowing access to the charging socket 420 and the closed position in which the charging socket 420 is substantially enclosed. The door may be rotatably mounted along one edge about a hinge. The door may rotate about an upper edge parallel with a plane of the bonnet of the vehicle 400. Furthermore, in some embodiments, the hinge may be moveable forward and backwards with respect to the vehicle, such that the door may rotate upward to open the enclosure 410, thereby permitting access to the socket 420, and then be moved rearward to prevent extension of the door forward of a front face of the vehicle 400. The door may be retracted, when generally horizontally extended after rotation about the hinge, into the vehicle 400. The door may be retracted under the bonnet of the vehicle 400. A means for opening and closing the enclosure according to an embodiment of the invention is discussed below.

In some embodiments the communication means 450 may be formed by one or more communication devices. The communication means 450 is for wirelessly communicating with a communication means 490 associated with a charging station 480 for providing the electrical supply to charge the battery (not shown) of the vehicle 400. The electrical supply of the charging station is coupled to an electrical system of the vehicle 400 via a plug 485 of the charging station 480 which is coupleable with the socket 420 of the vehicle 400. The communication means 450 of the vehicle 400 may comprise means for transmitting an interrogation signal and a means for receiving a response signal. The communication means 490 associated with the charging station 480 may comprise a tag device attached to the plug 485 arranged to receive the interrogation signal and to transmit the response signal. The device may be an RFID tag. The communication means 450 of the vehicle 400 may, in this embodiment, comprise a transmitter coil for transmitting the interrogation signal as an RF signal. The tag device 490 attached to the plug 485 comprises a receiver coil for receiving the interrogation signal and transmitting the response signal. The tag device 490 may modulate the response signal onto the interrogation signal. That is, communication 295 may be established between the transmitter coil of the vehicle's communication means 450 and the receiver coil of the tag device 490. The tag device 490 may modulate a field transmitted by the transmitter coil by varying an electrical loading represented by the tag device 490. The modulation may communicate a code to the communication means 450 of the vehicle 400.

The communication means 450 of the vehicle 400 may output a signal to the control means 440 indicative of the code received from the tag device 490. The control means may do one or more of authenticate that the vehicle 400 is proximal to a genuine charging station 480 and verify that the charging station provides a suitable electrical supply to charge the battery of the vehicle 400 based on the received code. If the control means 440 determines that one or both of the aforesaid conditions is met, the control means 440 may control the actuator means 430 to move the door of the enclosure 410 to the open position.

Referring to FIG. 3, prior to the method a vehicle 400 is located proximal to the charging station 480 illustrated in FIG. 4. The vehicle 400 may have arrived at that location, such as being driven to and parked in a parking space at a service station, or, for example, being parked on a driveway adjacent to the charging station 480.

Step 310 comprises a user, such as a former occupant of the vehicle 400 having disembarked, or by automatic means, such as a robotic means, unstowing the charging plug 485 from the charging station 480. The charging plug 485 may normally be located in a holder or retainer of the charging station 480. The user may obtain the charging plug 485 and move the charging plug 485 toward the vehicle 400, in particular the front of the vehicle 400 proximal to the location of the enclosure 410.

In step 320 it is determined whether the communication means 450 of the vehicle 400 is communicatively coupled to the communication means 490 associated with the charging station 480. Step 320 may comprise the transmitter coil of the vehicle's communication means 450 transmitting the interrogation RF signal and determining whether a response from the tag device 490 attached to the plug 485 is received. The response may be in the form of modulation applied to the interrogation RF signal by the tag device 490 attached to the plug 485 of the charging station 480. If a response is received, step 320 may comprise the control means 440 determining whether the received response is a predetermined response, such as a predetermined code.

In step 330, if the response received in step 320 meets one or more predetermined conditions, such as the received response being the predetermined code, then the actuator 430 is caused to open the enclosure 410 to facilitate access to the socket 420 housed therein. The actuator 430 may move a door of the enclosure 410, as discussed above, between the closed and open positions. In the open position the door may be substantially concealed or withdrawn into the vehicle 400.

In step 340 the charging plug 485 is received in the socket 420 of the vehicle 400. The charging plug 485 is inserted into the socket 420 by the user such that an electrical connection between the charging station 480 and the vehicle's electrical system is established for charging the battery of the vehicle 400. The battery of the vehicle is charged from the electrical supply in step 350.

In step 360 the charging plug 485 is removed from the socket 420. The charging plug 485 may be removed from the socket 420 by the user after a period of time, such as the time the user wishes to spend at the charging station, or when the battery reaches a charge level, which may be substantially full.

In step 370 it is determined whether communication is lost. That is, it is determined whether the communication means 450 of the vehicle 400 loses or is a distance from communicative coupling with the communication means 490 associated with the charging station 480. Step 370 may comprise the transmitter coil of the vehicle's communication means 450 transmitting the interrogation RF signal and determining whether the tag device 490 attached to the plug 485 provides a response signal. As noted above, the response may be in the form of modulation applied to the interrogation RF signal by the tag device 490 attached to the plug 485 of the charging station. If the response is received, the method returns to step 370 i.e. the method loops within step 370. If, however, communication is lost i.e. the communication means 490 associated with the charging station 480 fails to provide a response to the vehicle 400, then the method moves to step 380.

In step 380 the enclosure 410 is closed. The enclosure 410 in the closed configuration provides a substantially weatherproof housing for the socket 420. The enclosure 410 may be changed to the closed configuration by the door of the enclosure 410 being moved to the closed position by the actuator 430. The actuator 430 is caused to close the enclosure 410 to prevent further access to the socket 420 housed therein. The actuator 430 may move the door of the enclosure 410, as discussed above, between the open and closed positions. In moving the door to the closed position, the door may be moved outward from its position withdrawn into the vehicle 400 and then moved to the closed position to substantially seal the enclosure 410.

Table 1 below relates to an embodiment for commanding opening, closing and partially closing the enclosure for different vehicle status and battery status conditions. The first column of Table 1 provides the vehicle status. In Table 1 there are two options for the vehicle status: the vehicle is approaching a charging station, where a communication link has been established between the vehicle and the charging stations; and the vehicle battery is coupled to the charging station. The second column provides the battery status and the third column provides the enclosure command. As shown in Table 1, when the vehicle is approaching a charging station and the communication link is established, if the battery requires charging the enclosure will open. Alternatively, if no charging is required, the enclosure is kept closed. As shown in Table 1, when the vehicle battery is coupled to the charging station, the battery may either be charging, discharging to an electricity grid system, or may be in an idle state where no charging or discharging is occurring. When the battery is charging, the enclosure is kept partially closed. When the battery is discharging to the grid, the enclosure is kept partially closed. When the battery is not discharging or charging, the enclosure is opened. The enclosure commands in Table 1 may be modified by other examples provided in this disclosure. For example, partially closing the enclosure may require an authentication signal as described above.

TABLE 1

| Vehicle status | Battery status | Enclosure command |
| --- | --- | --- |
| Approaching charging station, communication link with charging station established | Requires charging | open enclosure |
| | No charging required | keep enclosure closed |
| Battery coupled to charging station | charging | keep enclosure partially closed |
| | discharging to electrcity grid system | keep enclosure partially closed |
| | no charging/ discharging | open enclosure |

Figure 5:
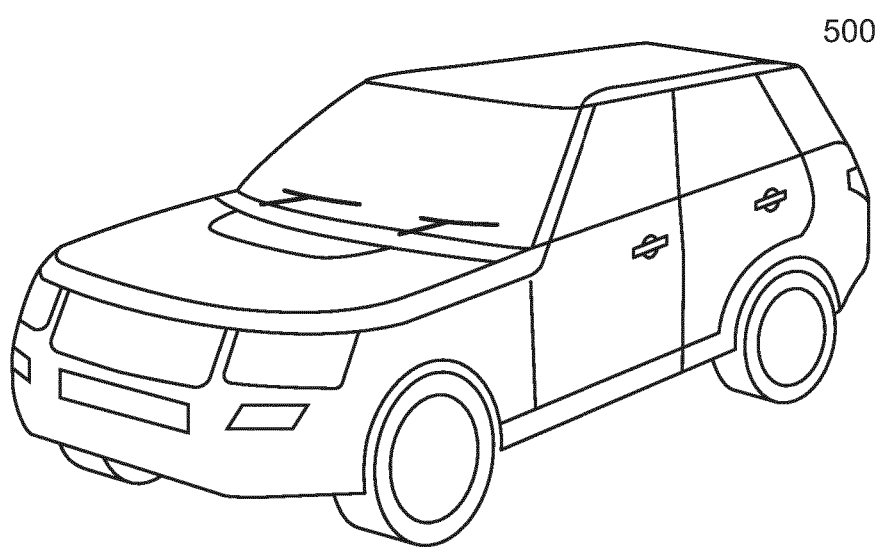
FIG. 5 is a vehicle according to an embodiment of the invention.

FIG. 5 illustrates a vehicle 500 according to an embodiment of the invention. The vehicle 500 comprises a control system and apparatus as described above, although said control system and apparatus are not visible in the exterior view of FIG. 5.

Figure 6:
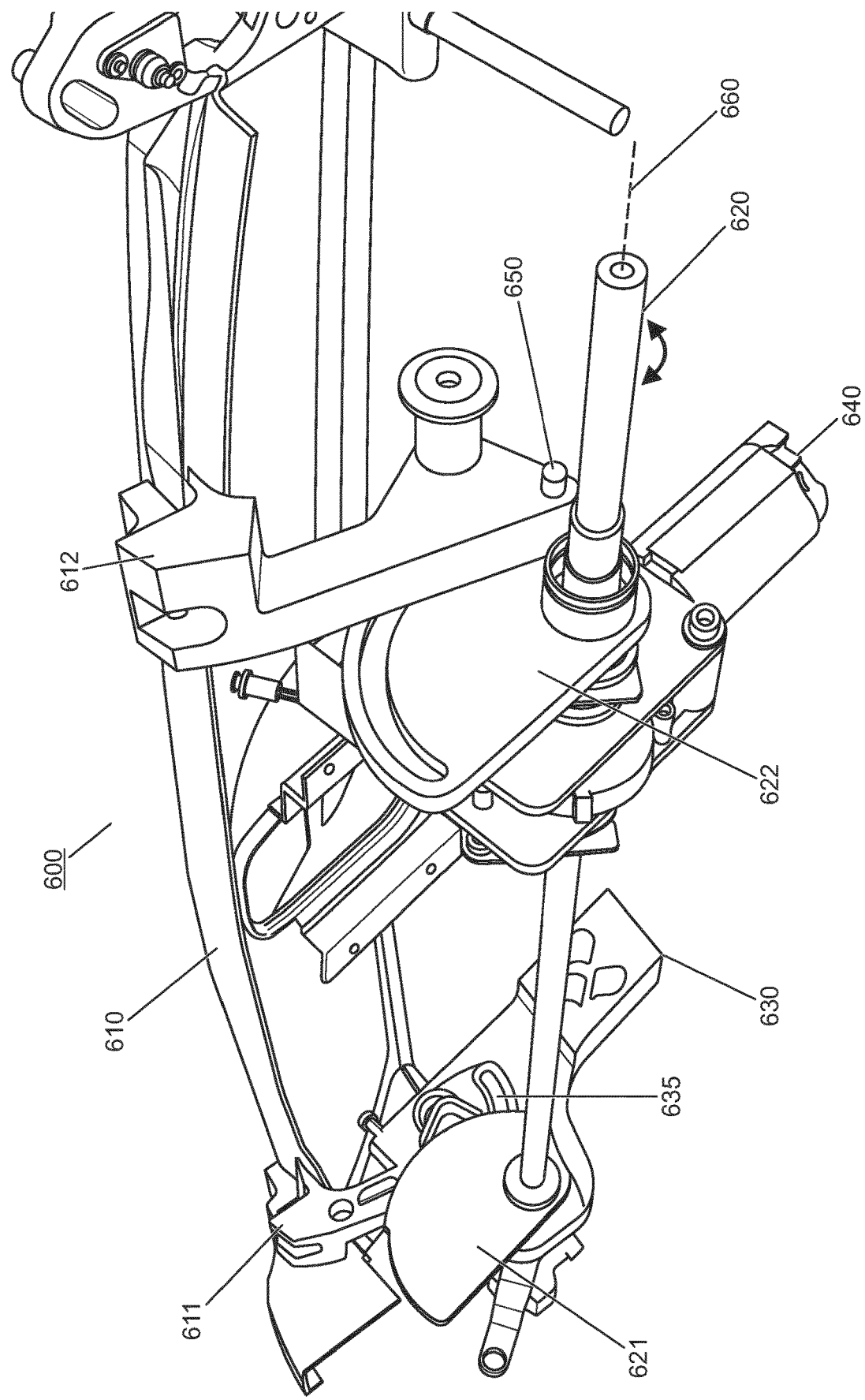
FIG. 6 illustrates a mechanism associated with an enclosure according to an embodiment of the invention.
Figure 7:
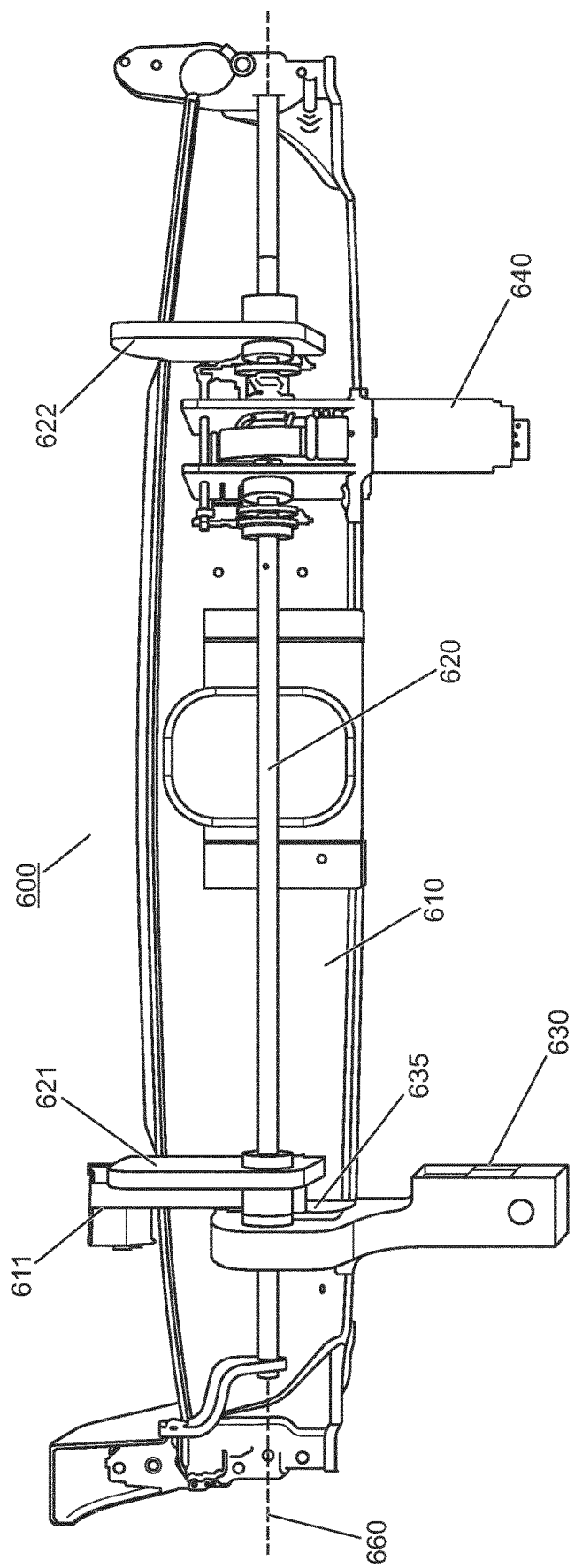
FIG. 7 illustrates a rear view of the mechanism associated with the enclosure shown in FIG. 6.
Figure 8:
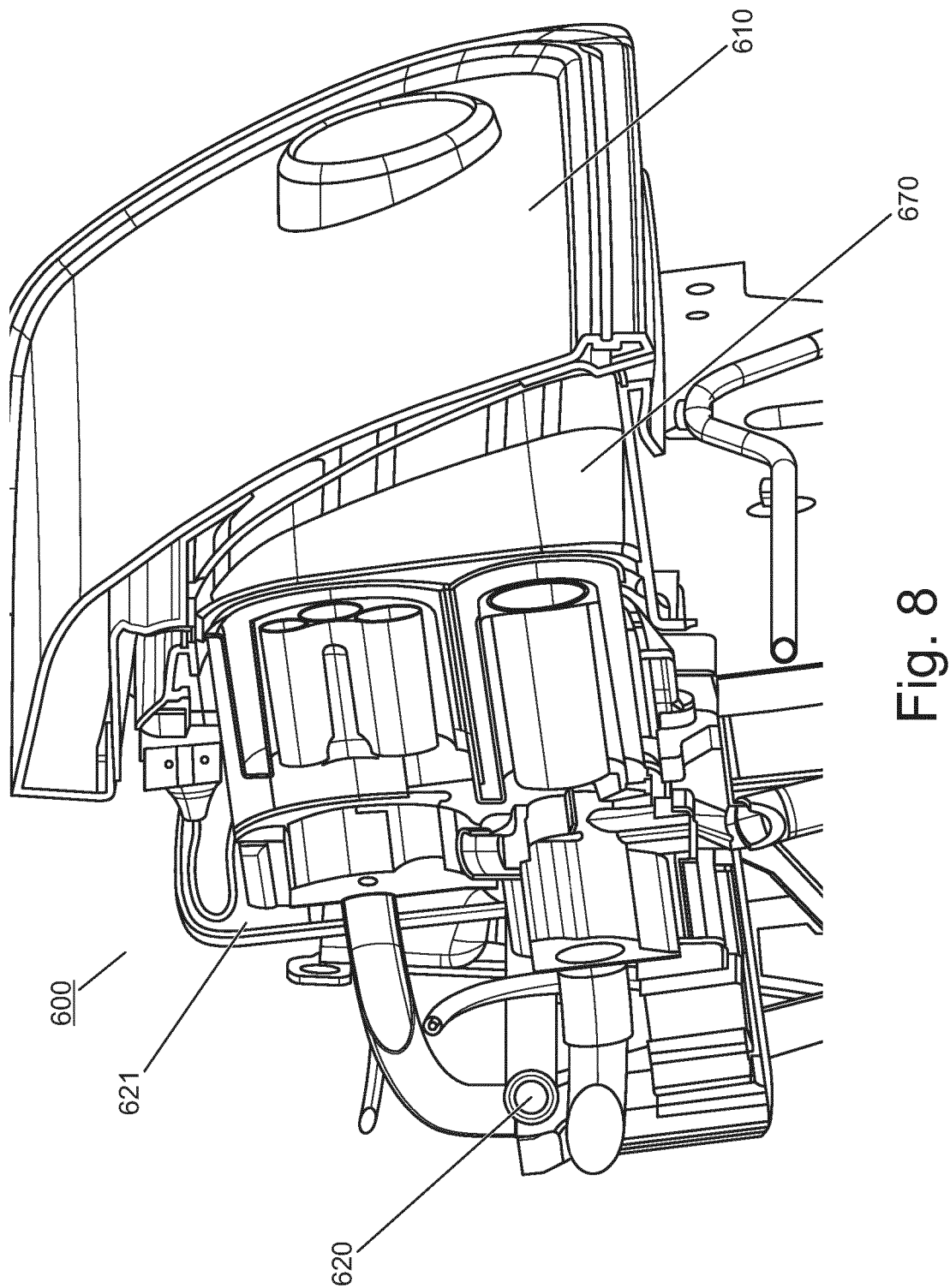
FIG. 8 illustrates a cross sectional view of the mechanism associated with the enclosure shown in FIG. 6.

FIGS. 6, 7, and 8 illustrate an enclosure 600 for one or more electrical sockets of a vehicle according to an embodiment of the invention. The electrical sockets may be used to charge battery means, such as a battery means for powering a propulsion means, of the vehicle. The enclosure 600 may be used in conjunction with the previously described embodiments wherein the enclosure 600 is openable in dependence on a received signal. However it will also be realised that the enclosure 600 may be operated responsive to a received user input, as will be explained.

The enclosure 600 may comprise two parts, a first part 610, which may form a body panel of the vehicle 400 when closed, such as a door, and a second part 670 housing one or more charging sockets. The first part may form a forward facing body panel of the vehicle which may be arranged generally between first and second headlights of the vehicle. The first part and second part 670 are moveable with respect to one-another. The first part 610 and second part 670 seal around a periphery by contacting together to seal the charging sockets therein. The first part 610, when in the closed position, is arranged to create a substantially sealed volume with the second part 670. The substantially sealed volume means there is no requirement for the charging sockets to have a separate cover, such as a respective spring loaded cover, to prevent one or both of dirt and liquid entering and damaging the socket and electrical system of the vehicle. An absence of a requirement for a cover also speeds up access to the charging socket thereby improving the user experience.

The first part 610 and second part 670 may have a longitudinal axis 660. The longitudinal axis may, in use, be arranged parallel to a lateral axis of the vehicle 400. The second part 670 may be shaped such that there is a curve about the longitudinal axis 660, such that a rear wall of the enclosure is spaced apart from the first part in the closed position. The one or more charging sockets may be arranged in the rear wall. This arrangement ensures that the one or more charging sockets are set back within the enclosure, thereby allowing the first part 610 to form a substantially sealed volume when in the closed position with respect to the second part 670. In other embodiments, the second part 670 may also comprise forward walls extending forwards tangentially from the curved portion. Furthermore, in some embodiments the first part 610 may also have a curve about the longitudinal axis. In some embodiments one or both of the first part 610 and the second part 670 may have sealing means such as formed by a flexible seal to aid in preventing water and dirt ingress into the enclosure when in the closed position. It will be appreciated that an alternatively shaped second part 670 or first part 610 may be used to create a substantially sealed volume for housing the one or more charging sockets.

In one embodiment the first part 610 is arranged to be moveable by an actuator means in the form of an actuator device, as described above. The actuator means may comprise an electric motor, hydraulic actuator, such as a ram, or magnetically operated. The first part 610 may be supported upon a plurality of supporting means, in the form of supports, such as brackets 611, 612. The bracket 611, 612 may be fixedly secured to the first part 610 and arranged to move with first part 610. The bracket may be arranged between one of the plurality of cams 621. 622 and one of the plurality of fixed members 635. Each bracket 611, 612 further comprises a pin 650. The pin 650 outwardly extends from the respective bracket 611, 612. The pin 650 may extend in the longitudinal axis. Each pin 650 is arranged to move in a plurality of tracks as will be described later.

Figure 9:
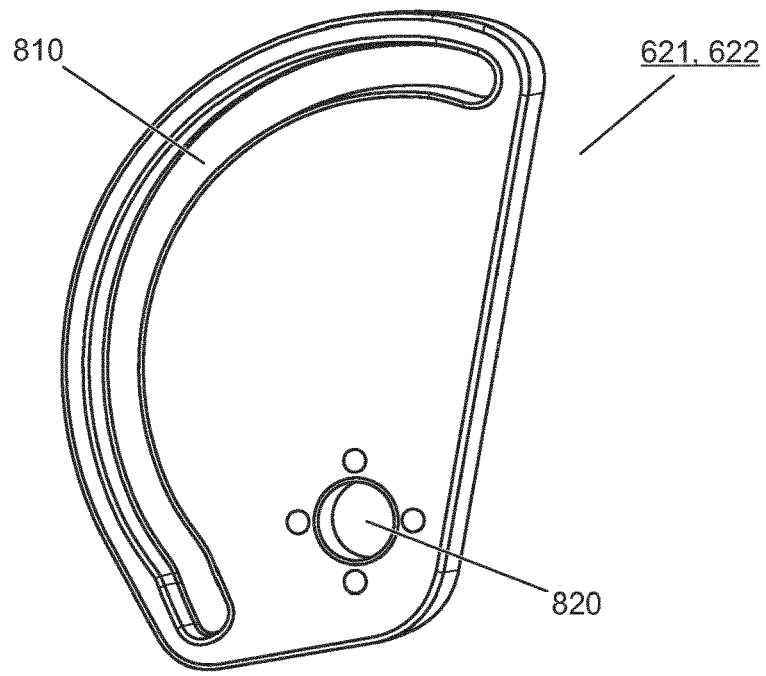
FIG. 9 illustrates a component of the mechanism shown in FIGS. 6, 7 and 8.

The enclosure 600 further comprises a mechanism for communicating movement of the actuator means to one or both of the first 610 and second 670 parts. In some embodiments the mechanism may provide for the opening and closing of the first part 610 with respect to the second part 670. The mechanism comprises an axle 620 arranged parallel to the longitudinal axis 660. The axle 620 is connected to the actuator means 640 such that rotation of the actuator means 640 causes a corresponding rotation of the axle 620. Attached to, and arranged to move with the axle, are a plurality of cams 621, 622. The cams 621, 622 may take the form as shown in FIG. 9. The cams 621, 622 may be arranged at a plurality of locations the length of the axle 620. In some embodiments the cams 621, 622 may be spaced at regular intervals along the axle 620. In some embodiments the cams 621, 622 may be arranged at opposing ends of the axle 620 as show in FIGS. 6 and 7.

As shown particularly in FIG. 9, which shows an embodiment of one of the cams 621, 622, the came 621, 622 may comprise a track 810 and an aperture 820. The aperture 820 is for receiving the axle 620 such that rotation of the axle 620 causes rotation of the cam 621, 622. The track 810 is spaced apart from the aperture 820. The track 810 may be generally arcuate. In some embodiments the track 810 comprises a linear portion and a curved portion. The curved portion may be of greater length that the linear portion. The track comprises opposing walls to define the track. The walls may form a recess in the cam 621, 622. The track 810 is arranged to receive the pin 650 extending from the first part 610.

The track 810 is arranged such that, when the pin 650 attached to the one or more brackets 621, 622 travels within the track 810, the first part 610 follows a path relative to the longitudinal axis 660 of the second part 670 that includes a circumferential component about the longitudinal axis 660 and a radial component towards the longitudinal axis 660. When moving radially towards the longitudinal axis 660 the first part 610 forms a substantially sealed volume with the second part 670. That is, the first part is brought together with the second part 670 by the radial movement toward the longitudinal axis 660. The radial movement toward the longitudinal axis 660 causes the first 610 and second 670 parts to abut.

Figure 10:
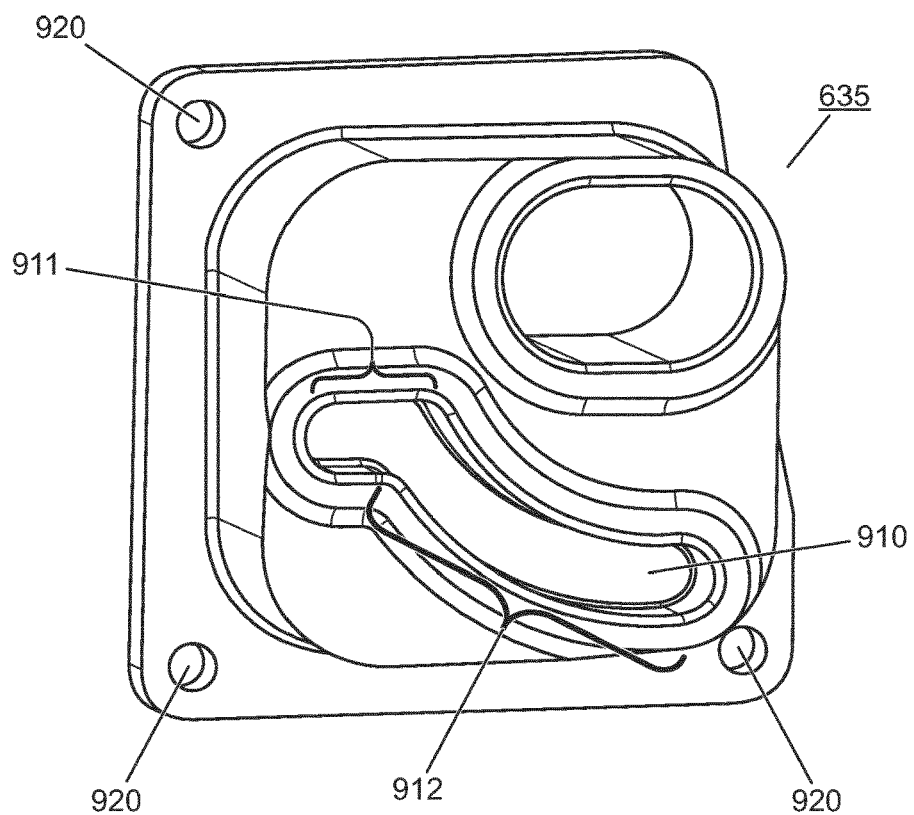
FIG. 10 illustrates a further component of the mechanism shown in FIGS. 6, 7, and 8.

To facilitate the movement of the first part 610 in the manner described above the pin 650 also follows a second track 910 located in a fixed member 635. The fixed member 635 may be of the form as shown in FIG. 10. The fixed member 635 may have one or more securing points 920, such as apertures, used to secure the fixed member 635 in a fixed location with respect to the vehicle. The fixed member 635 may be secured by the securing points 920 to a securing bracket 630 which in turn is secured to the body of the vehicle 400.

The second track 910 of the fixed member 635 may comprise a linear portion 911 and a curved portion 912. The curved portion 912 may be of greater length that the linear portion 911. The linear portion 911 of the track 910 is arranged such that the first part 610 moves forward and backwards with respect to the longitudinal axis 660 and the second part as the pin 650 moves there-along. The curved portion 912 of the track is arranged such that the first part 610 rotates circumferentially about the longitudinal axis 660 as the pin 650 is forced to move through the track 910 by the rotating cams 621, 622. It will be appreciated that embodiments of the invention may have one or more fixed members 635 arranged along the length of the axle 620. It will also be appreciated that the fixed member 635 may contain a different shaped track 910 arranged such that the first part 610 is able to provide access to the interior of the enclosure, containing the charging socket, and form a sufficiently sealed volume with the second part 670.

In operation, the actuator means 640 rotates the axle 620, and the attached cams 621, 622, about the longitudinal axis 660. As the cams 621, 622 rotate, the pin 650 is arranged to move along the track 810 in the cams 621, 622. The curved nature of the curved portion of the track 810 forces the pin 650 to also move forward and backwards along the track 910 of the fixed member 635 in response to the rotating cams 621, 622 and axle 620. When the first part 610 is opening, the pin 650 follows the track 910 in the fixed member 635. This causes the first part 610, which is connected to the one or more pins 650 by a plurality of brackets 611, 612 as described above, to move radially away from the axle 620 as the pin 650 follows the linear portion 911 of the track 910, and then rotate up circumferentially about the axle 620 as the pin 650 follows the curved portion 912. When closing, the first part 610 first rotates down circumferentially about the axle 620, and then radially towards the axle 620 such that an external surface of the first part 610 lies flush with the surrounding surfaces of the vehicle i.e. the external body of the vehicle. As with the opening movement, the shape of the track 910 of the fixed member 635 enables the first part 610 to first rotate downwards, as the pin 650 follows the track 810 in the cam 621, 622 and also moves along the curved portion of the track 910 of the fixed member 635. As the axle 610 continues rotating, the pin 650 continues to move along the track 910 of the fixed member 635. The linear portion 911 of the track 910 of the fixed member 635 causes the first part 610, to move backwards and lie flush with the surrounding surfaces and create a seal between the first part and the rest of the enclosure, preventing moisture and dirt from entering the enclosure and damaging the charging socket.

As described above in relation to FIG. 4, in one embodiment the enclosure may be caused to be opened by proximity to a charging apparatus, such as bringing a charging plug 485 near to the charging socket 420. Conversely, the enclosure may close when the charging plug 485 is a predetermined distance from the charging socket 420. In other embodiments the enclosure may be opened and closed by a user, such as responsive to other command means, such as a received button input, GUI input, voice command or a gesture, may be used to initiate the opening and closing of the enclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of charging an electric vehicle, comprising: determining whether a battery of the electric vehicle is fully charged; receiving, at the electric vehicle, a wireless signal associated with an electric vehicle charging apparatus; controlling an actuator to open an enclosure housing a socket for receiving a charging plug of the electric vehicle charging apparatus, in dependence on receiving the wireless signal; and if the battery is fully charged, controlling the actuator to not open the enclosure.

2. The method of claim 1, wherein the wireless signal is transmitted by a transmitter associated with the charging plug of the electric vehicle charging apparatus.

3. The method of claim 1, wherein the wireless signal is a short-range wireless signal.

4. The method of claim 1, wherein the wireless signal is an RFID signal generated by a device associated with the electric vehicle charging apparatus.

5. The method of claim 1, further comprising controlling the actuator to close the enclosure, in dependence on ceasing to receive the wireless signal.

6. The method of claim 1, further comprising initiating charging of the battery of the electric vehicle in dependence on receiving the charging plug of the electric vehicle charging apparatus.

7. The method of claim 6, further comprising receiving an authentication signal from an authentication device.

8. The method of claim 7, wherein the authentication signal from the authentication device indicates locking of the electric vehicle.

9. The method of claim 1, further comprising determining an identity of the electric vehicle charging apparatus and suitability of the electric vehicle charging apparatus to charge the electric vehicle based on the identity, wherein the controlling the actuator to open the enclosure is performed in dependence on the suitability of the electric vehicle charging apparatus.

10. The method of claim 1, wherein the controlling the actuator to open the enclosure is performed in dependence on the battery being fully charged.

11. The method of claim 1, further comprising determining a status of a charging system of the electric vehicle, wherein the controlling the actuator to open the enclosure is performed in dependence on the status.

12. The method of claim 1, wherein the electric vehicle charging apparatus is coupled to an electric grid system, and wherein the method further comprises initiating discharging of the battery of the electric vehicle, in dependence on the battery being coupled to the electric vehicle charging apparatus, and wherein discharged electrical power of the battery is provided to the electric grid system.

13. The method of claim 12, wherein the battery is coupled to the electric vehicle charging apparatus via the charging plug of the electric vehicle charging apparatus, and wherein the method further comprises partially closing the enclosure when the battery is discharging to the electric grid system, thereby securing the charging plug.

14. The method of claim 13, further comprising opening the enclosure when the discharging is completed, thereby enabling removal of the charging plug.

15. A system for charging an electric vehicle, comprising: a sensor configured to determine whether a battery of the electric vehicle is fully charged; a receiver configured to receive a wireless signal associated with an electric vehicle charging apparatus and to output a signal in dependence thereon; an actuator configured to move a portion of an enclosure between an open position and a closed position, wherein in the open position the enclosure permits access to a charging socket of the electric vehicle housed therein and in the closed position the enclosure is closed around the charging socket; and a controller configured to receive the signal output by the receiver and to control the actuator to selectively configure the enclosure in the open and closed positions in dependence thereon; wherein, if the battery is fully charged, the actuator is not controlled to open the cover portion.

16. The system of claim 15, wherein the enclosure comprises a cover portion arranged to be moveable by the actuator between an open position allowing access to the charging socket and a closed position in which the charging socket is enclosed.

17. The system of claim 16, wherein: the cover portion forms an external surface of the vehicle; and the enclosure comprises a second part having a longitudinal axis forming a rear of the enclosure; wherein the actuator is arranged to move the cover portion between an open and a closed position relative to the second part, and wherein, in moving from the open position to the closed position, the cover portion follows a path relative to the longitudinal axis that includes a circumferential component about the longitudinal axis and a radial component towards the longitudinal axis, and by moving radially towards the longitudinal axis, the cover portion forms a sealed enclosure with the second part.

18. An electric vehicle, comprising: a charging socket housed within an enclosure, the enclosure being selectively openable and closeable by an actuator; a sensor configured to determine whether a battery of the electric vehicle is fully charged; a receiver configured to receive a wireless signal associated with an electric vehicle charging apparatus; and
    a controller configured to control the actuator to open the enclosure in dependence on the receiver receiving the wireless signal; wherein, if the battery is fully charged, the actuator is not controlled to open the cover portion.

19. The vehicle of claim 18, further comprising a transmitter configured to transmit a wireless signal to the electric vehicle charging apparatus.

20. The vehicle of claim 19, wherein the transmitter comprises a coil for coupling with a device associated with the electric vehicle charging apparatus and the receiver is arranged to determine modulation of an electromagnetic field transmitted by the transmitter.

\* \* \* \* \*